United States Patent
Komatsu (10) Patent No.: US 8,203,728 B2
(45) Date of Patent: Jun. 19, 2012

(54) PRINT DEVICE, PRINT METHOD, PRINT PROGRAM RECORDING MEDIUM, PRINT DATA PRODUCTION DEVICE, PRINT DATA PRODUCTION METHOD, AND PRINT DATA PRODUCTION PROGRAM RECORDING MEDIUM

(75) Inventor: Takashi Komatsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1028 days.

(21) Appl. No.: 11/765,597

(22) Filed: Jun. 20, 2007

(65) Prior Publication Data

US 2008/0100854 A1    May 1, 2008

(30) Foreign Application Priority Data

Oct. 31, 2006    (JP) ................. 2006-296224

(51) Int. Cl.
*G06K 15/00* (2006.01)
(52) U.S. Cl. ........... 358/1.14; 399/366; 283/74; 283/94; 283/902; 380/51; 380/54; 358/1.13; 358/1.15; 709/223
(58) Field of Classification Search .................. 358/1.14
See application file for complete search history.

(56) References Cited

U.S. PATENT DOCUMENTS

| | | | |
|---|---|---|---|
| 5,915,024 A | 6/1999 | Kitaori et al. | |
| 7,934,098 B1* | 4/2011 | Hahn et al. | 713/176 |
| 2004/0225884 A1* | 11/2004 | Lorenzini et al. | 713/176 |
| 2005/0053239 A1 | 3/2005 | Nomizu et al. | |
| 2005/0204129 A1* | 9/2005 | Sudia et al. | 713/158 |
| 2006/0026150 A1 | 2/2006 | Hamada | |
| 2006/0161779 A1* | 7/2006 | Geoffrey | 713/176 |
| 2007/0022293 A1 | 1/2007 | Hayashi et al. | |
| 2010/0195137 A1 | 8/2010 | Hamada | |

FOREIGN PATENT DOCUMENTS

| | | |
|---|---|---|
| JP | 103257 | 1/1998 |
| JP | 1188323 | 3/1999 |
| JP | 2001223735 A | 8/2001 |
| JP | 2002064481 A | 2/2002 |
| JP | 2004165778 A | 6/2004 |
| JP | 2005313652 A | 11/2005 |
| JP | 2006011857 A | 1/2006 |
| JP | 2007060594 A | 3/2007 |
| JP | 2007249403 A | 9/2007 |

OTHER PUBLICATIONS

Japanese Notice of Grounds for Rejection in connection with Japanese Patent Application No. 2006-296224 issued on Jul. 26, 2011 with English translation thereof.

* cited by examiner

*Primary Examiner* — Twyler Haskins
*Assistant Examiner* — Brendan McCommas
(74) *Attorney, Agent, or Firm* — Gesmer Updegrove LLP (57) ABSTRACT

A print device includes a print data acquisition unit that acquires print data having a plurality of signature attachment areas defined thereon, each signature attachment area having electronic signature data produced therefor and attached thereto, a range data acquisition unit that acquires data indicative of a range of a print target area defined on the print data, and a verification unit that verifies, before completion of acquisition of the print data by the print data acquisition unit, the electronic signature data attached to the signature attachment area containing at least a part of the print target area.

19 Claims, 6 Drawing Sheets

PRINT DEVICE, PRINT METHOD, PRINT PROGRAM RECORDING MEDIUM, PRINT DATA PRODUCTION DEVICE, PRINT DATA PRODUCTION METHOD, AND PRINT DATA PRODUCTION PROGRAM RECORDING MEDIUM

CROSS-REFERENCE TO RELATED APPLICATIONS

This application is based on and claims priority under 35 USC 119 from Japanese Patent Application No. 2006-296224, filed on Oct. 31, 2006.

BACKGROUND

1. Technical Field

The present invention relates to a print device, a print method, a print program recording medium, a print data production device, a print data production method, and a print data production program recording medium.

2. Related Art

As a method for preventing falsification of electronic data by a third party, there is known a method for attaching an electronic signature (referred also as a digital signature).

SUMMARY

According to an aspect of the invention, there is provided a print device including a print data acquisition unit that acquires print data having a plurality of signature attachment areas defined thereon, each signature attachment area having electronic signature data produced therefor and attached thereto; a range data acquisition unit that acquires data indicative of a range of a print target area defined on the print data; and a verification unit that verifies, before completion of acquisition of the print data by the print data acquisition unit, the electronic signature data attached to the signature attachment area containing at least a part of the print target area.

BRIEF DESCRIPTION OF THE DRAWINGS

An exemplary embodiment of the present invention will be described by reference to the following figures, wherein.

DETAILED DESCRIPTION

In the following, an exemplary embodiment will be described.

Figure 1:
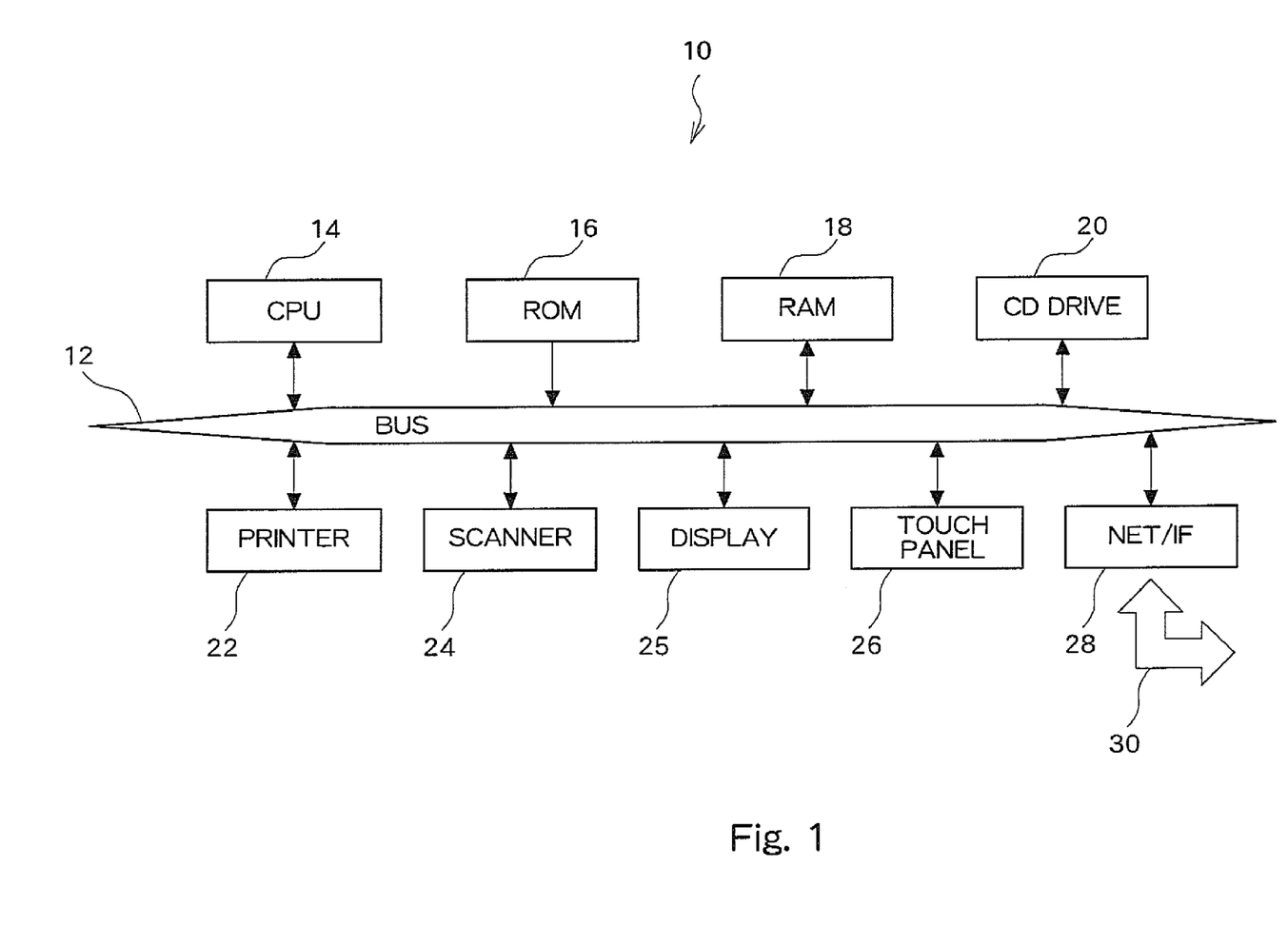
FIG. 1 is a diagram explaining a hardware structure of an image-processing device according to an exemplary embodiment.

FIG. 1 is a schematic diagram showing a device structure of an image-processing device 10 according to this exemplary embodiment, which includes a bus 12 serving as an internal communication path. To the bus 12 are connected a CPU (central processing unit) 14, ROM (Read Only Memory) 16, RAM (Random Access Memory) 18, a CD (compact disc) drive 20, a printer 22, a scanner 24, a display 25, a touch panel 26, and an NET/IF (network interface) 28.

The CPU 14 is a device having an arithmetic processing function, and carries out various arithmetic processes and comprehensive adjustment of the respective structural elements in accordance with a program stored in the ROM 16, or the like. The ROM 16 is an unrewritable semiconductor memory device, and has a program and data installed therein during the course of manufacturing. The RAM 18 is a rewritable semiconductor memory device for use in reading and writing of working data, or the like. It should be noted that the image-processing device 10 may have a mass storage device, such as a magnetic disk drive, or the like. The CD drive 20 is a device for reading and writing with respect to a CD, or a storage medium. A new program, a program for update, and so forth, can be installed from a CD. Thus, a program for controlling the image-processing device 10 can be provided as stored in a recording medium, such as a CD-ROM, or the like, rather than being installed in advance in the ROM 16. In this case, the user arranges to read a program from a CD-ROM via the CD drive 20 for installation in the image-processing device 10.

The printer 22 is a device for printing on a sheet based on print data. The print data here refer to data (information) to be printed. No particular limitation is imposed on the description format (format) of print data, and various formats, such as an image format, a word processor file format, a text format, and so forth, are applicable. The printer 22 carries out double-sided printing, size-reduction printing in which reduce-sized images of two or more pages are printed on one side of a sheet (may be referred to as data-intensive print), and so forth, in accordance with the setting. The scanner 24 reads data on a sheet to produce image data based thereon. The display 25 shows an image, presenting visible information to a user. The touch panel 26 is an input receiving device for receiving a user input. The NET/IF 28 achieves connection to an intranet and/or the Internet 30, or external communication paths. Via the NET/IF 28, the image-processing device 10 can transmit produced image data, and receive print data, print instruction data, and program signal data to be installed via the network. This enables provision of a program via the network, rather than a storage medium, such as a CD-ROM, or the like, to be installed into the image-processing device 10 via the NET/IF 28.

The image-processing device 10 shown in FIG. 1 incorporates the printer 22 and the scanner 24, and operates exclusively for image processing while functioning as a print device, a reading device, a copy machine (a copy device), and so forth. The hardware structure of the image-processing device 10 is substantially equivalent to that of a typical computer, such as a PC (personal computer), and so forth, except for incorporation of the printer 22 and the scanner 24. The hardware structural elements of the image-processing device 10 may be separately disposed. For example, the printer 22 may be accommodated in an enclosure different from that of the image-processing device 10 and connected via a dedicated cable to the image-processing device 10, or separately disposed in the intranet, so that a distributed system including a printer server and a printer is constructed. It should be noted that the independent printer 22 may have a CPU, a ROM, or the like, so that the printer 22 can be controlled independently. In addition to the printer 22, examples of the print device include one for plate printing, such as for offset, gravure, and so forth, and one for plate-less printing, such as an ink-jet printer, or the like.

Figure 2:
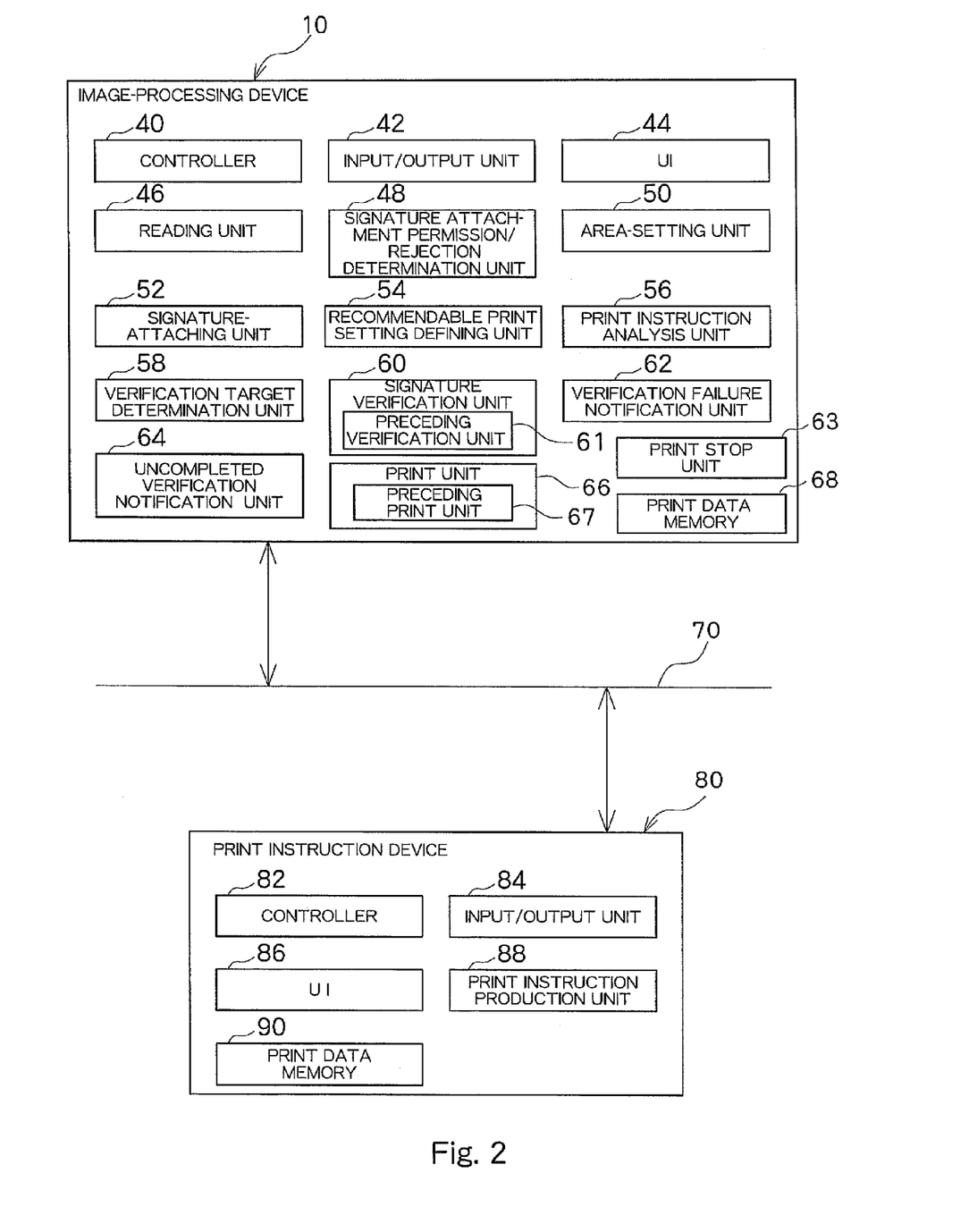
FIG. 2 is a diagram explaining an example functional structure of the system according to this exemplary embodiment.

FIG. 2 is a diagram explaining a functional structure of a system according to this exemplary embodiment. To this system are connected the image-processing device 10, shown in FIG. 1, and a print instruction device 80 constituted from a PC, both connected to a network 70, such as the Internet, or the like.

In the image-processing device 10, many functional elements are available as a result of controlling various hardware structural elements, such as the CPU 14, or the like, in accordance with a program. Specific functional elements of the image-processing device 10 include a controller 40, an input/output unit 42, a UI (User Interface) 44, a reading unit 46, a signature attachment permission/rejection determination unit 48, an area-setting unit 50, a signature-attaching unit 52, a recommendable print setting defining unit 54, a print instruction analysis unit 56, a verification target determination unit 58, a signature verification unit 60, a verification failure notification unit 62, a print stop unit 63, a uncompleted verification notification unit 64, a print unit 66, and a print data memory 68.

The controller 40 is formed from the CPU 14, and is responsible for overall control of the image-processing device 10, including adjustment of the processes of the respective functional elements, and so forth. The input/output unit 42 is formed from the NET/IF 28, and sends image data via the network 70 to the print instruction device 80, and receives print data and a print instruction data from the print instruction device 80. The UI 44 is formed from the display 25 and the touch panel 26, and presents information to the user and receives a user instruction.

The respective elements described above from the reading unit 46 to the recommendable print setting defining unit 54 are responsible mainly for production of image data (print data) and attachment of a signature thereto.

The reading unit 46 is formed from the scanner 24, and reads data on a sheet to produce image data. The produced image data are printable print data.

The signature attachment permission/rejection determination unit 48 defines a partial signature attachment area (an area to which a signature is attached) on the print data, such as the produced image data, and determines whether or not to permit attachment of a signature thereto. The determination is made on the basis of the attribute information of the print data. Specifically, when it is found in a character recognition process applied to print data that the print data has an attribute value indicative of prohibition of partial signature attachment, the signature attachment permission/rejection determination unit 48 determines prohibition of partial signature attachment. Data with setting prohibition may include, for example, data, such as receipts, invoices, and so forth, whose overall credibility is affected by falsification of a numeric value thereof. Further, when checking attributes, such as the storage position and/or owner of the print data, shows that the attribute has an attribute value indicative of prohibition of partial signature attachment, partial signature attachment may be determined to be prohibited. As an example, partial signature attachment to data stored in a storage position where highly confidential data is likely to be stored may be determined to be prohibited. In addition, permission and prohibition of partial signature attachment may be determined on the basis of a user instruction.

The area-setting unit 50 determines what signature attachment area is set on print data. As an example, a signature attachment area may be defined in units of a page or a sentence structural unit (a paragraph, a chapter, or the like). Alternatively, a signature attachment area may be defined in accordance with a recommendable print setting recommended by the recommendable print setting defining unit 54. In general, the entire set of print data may be defined as a signature attachment area.

The signature-attaching unit 52 attaches an electronic signature to the signature attachment area defined by the area-setting unit 50 to thereby produce electronic signature data. Generally, the electronic signature data are produced by calculating a hash value (a unidirectional functional value) of the signature attachment area and encrypting the obtained hash value, by means of a private key of the image-processing device 10 or the user thereof. The electronic signature data may be embedded in the respective signature attachment areas of the print data or produced in the form of independent data (an electronic file).

The functional elements described above from the print instruction analysis unit 56 to the print unit 66 are mainly responsible for receiving an instruction to print image data (print data) and carrying out processes for printing.

The print instruction analysis unit 56 analyzes the print instruction data input via the network 70. An example print instruction may include a reduction/enlargement instruction, a rotation print instruction, a specification of a print target area (for example, an area to be printed among two or more pages), a double-sided printing instruction, a specification of the number of pages to be printed on one page, and an instruction for printing in a rearranged order in order to prepare for a booklet to be made by folding the sheet, or the like.

The verification target determination unit 58 determines how to verify the signature attached to a print target area. That is, a determination is made that a signature attached to a certain signature attachment area should be verified at a certain timing in order to efficiently verify the signature/signatures for the entire print target area.

The signature verification unit 60 verifies an electronic signature. Specifically, the hash value calculated in relation to the signature attachment area is compared with the value obtained by decoding the electronic signature data, by means of a public key (corresponding to the encryption key used in encryption). Coincidence of these values indicates successful verification (no falsification); lack of coincidence of these values indicates verification failure (falsification occurred). The signature verification unit 60 has a preceding verification unit 61. The preceding verification unit 61 occasionally verifies a partial signature in accordance with the result of determination by the verification target determination unit 58, even before completion of the ongoing input of the print data accompanying the print instruction data. It should be noted that the signature verification unit 60 verifies the electronic signature attached to the entire print data after completion of the input of the print data, when necessary.

When signature verification fails after printing of the print data already begins, the verification failure notification unit 62 notifies the user of the failure. As an example notification, a denotation indicative of failed verification may be shown on the UI 44. Alternatively, a denotation indicative of failed verification may be printed on the sheet following the sheet having been output by then. One or a combination of two of these manners for notification may be employed. When the signature verification does not fail (all succeed), the fact that all signatures are authentic may be notified.

When signature verification fails after printing of the print data has already begun, the print stop unit 63 causes the print unit 66 to stop the ongoing printing. In stopping the ongoing printing, the process performed by the verification failure notification unit 62 may or may not be carried out. The determination as to whether or not to stop the ongoing printing when the verification fails may be left to the user.

When printing the print data begins before completion of the signature verification, the uncompleted verification notification unit 64 notifies the user that the verification has yet to be completed. Specifically, a denotation indicative of uncompleted verification may be shown on the UI 44. Alternatively, a denotation indicative of uncompleted verification may be printed on the margin of the sheet being printed.

The print unit 66 is formed from the printer 22, for printing print data in accordance with a print instruction. The print unit 66 has a preceding print unit 67. The preceding print unit 67 prints data of the area verified, before completion of the reception of the print data. It should be noted that the print data pertaining to a printed portion may be deleted if not used again.

The print data memory 68 is a device for storing image data to be printed. Image data may be data obtained from the outside or produced by the functional elements described above from the reading unit 46 to the recommendable print setting defining unit 54 and then given a signature. The image-processing device 10 can read the print data, and apply signature verification and/or printing.

In the following, the print instruction device 80 will be described. The print instruction device 80 is formed by installing a program into a PC. The print instruction device 80 includes functional elements including a controller 82, an input/output unit 84, a UI 86, a print instruction production unit 88, and a print data memory 90.

The controller 82 is responsible for overall control of the print instruction device 80; specifically, adjusting the processes of the respective functional elements, and so forth. The input/output unit 84 communicates with the image-processing device 10 via the network 70. The UI 86 presents information about the print instruction device 80 to the user, and receives a user instruction. The print instruction production unit 88 produces print instruction data pertaining to the image-processing device 10 based on the instruction from the UI 86. The print data memory 90 stores print data, such as image data, or the like, obtained from the image-processing device 10, and print data produced by the print instruction device 80.

Here, an operation of the system shown in FIG. 2 will be described. In the following example, the print data (image data) produced by the image processing device 10 are stored in the print instruction device 80, which, in turn, instructs the image-processing device 10 to print the print data.

In the image-processing device 10, the reading unit 46 reads data on a sheet in accordance with a user instruction from the UI 44, and produces image data. The user can specify a recommendable printing setting for the image data. For this purpose, the recommendable print setting defining unit 54 embeds metadata about the recommendable print setting in the image data. The signature attachment permission/rejection determination unit 48 determines whether or not to permit partial signature attachment, based on the attribute of the image data. When partial signature attachment is permitted, the area-setting unit 50 defines a signature attachment area. The definition of a signature attachment area may be achieved in a predetermined standard manner or another manner convenient for the printing set by the recommendable print setting defining unit 54. Alternatively, the definition may be made based on the user's instruction. The signature-attaching unit 52 produces electronic signature data pertaining to the signature attachment area set. The electronic signature data may be embedded in the head of the image data, for example, and thereby associated with the image data.

The thus-produced image data are sent, together with the signature data, to the print instruction device 80 used by the user, and stored in the print data memory 90. In order to print the image data, the user specifies the image data and defines a print range by operating the UI 86 of the print instruction device 80. The user can designate double-sided printing, printing of two or more page images on the same sheet, and so forth. With the above, print instruction data are produced. The produced print instruction data are sent to the image-processing device 10, together with the image data and the electronic signature data. It should be noted that the production and transmission of the print instruction data is often achieved by means of software referred to as a print driver for controlling the image-processing device 10. The print instruction data may be transmitted integrally with one or both of the image data and the electronic signature data, or separately. In any case, the respective data sets are arranged (a transmission order) such that the print instruction data are input to the image-processing device 10 prior to the image data, and that the electronic signature data pertaining to each signature attachment area are input to the image-processing device 10 prior or subsequent to the corresponding portion in the print data.

In the image-processing device 10, the print instruction analysis unit 56 analyzes the received print instruction data to obtain information about which portion of the image data should be printed in what format. With reference to the electronic signature data, the verification target determination unit 58 determines a signature attached to which signature attachment area should be verified in order to verify the signature for the print target area.

In the signature verification unit 60, when the image data inputting process proceeds until input of the amount of image data sufficient to allow partial signature verification, the preceding verification unit 61 carries out signature verification. Accordingly, in the print unit 66, the preceding print unit 67 prints the portion of the print data, the portion subjected to successful signature verification, without waiting for reception of all image data. In the above, the uncompleted verification notification unit 64 continues to notify of the uncompleted verification until the verification is fully completed. When signature verification failure becomes obvious after the printing has already begun, the verification failure notification unit 62 notifies of the failure.

In the following, a specific example will be described with reference to FIGS. 3 to 5.

Figure 3:
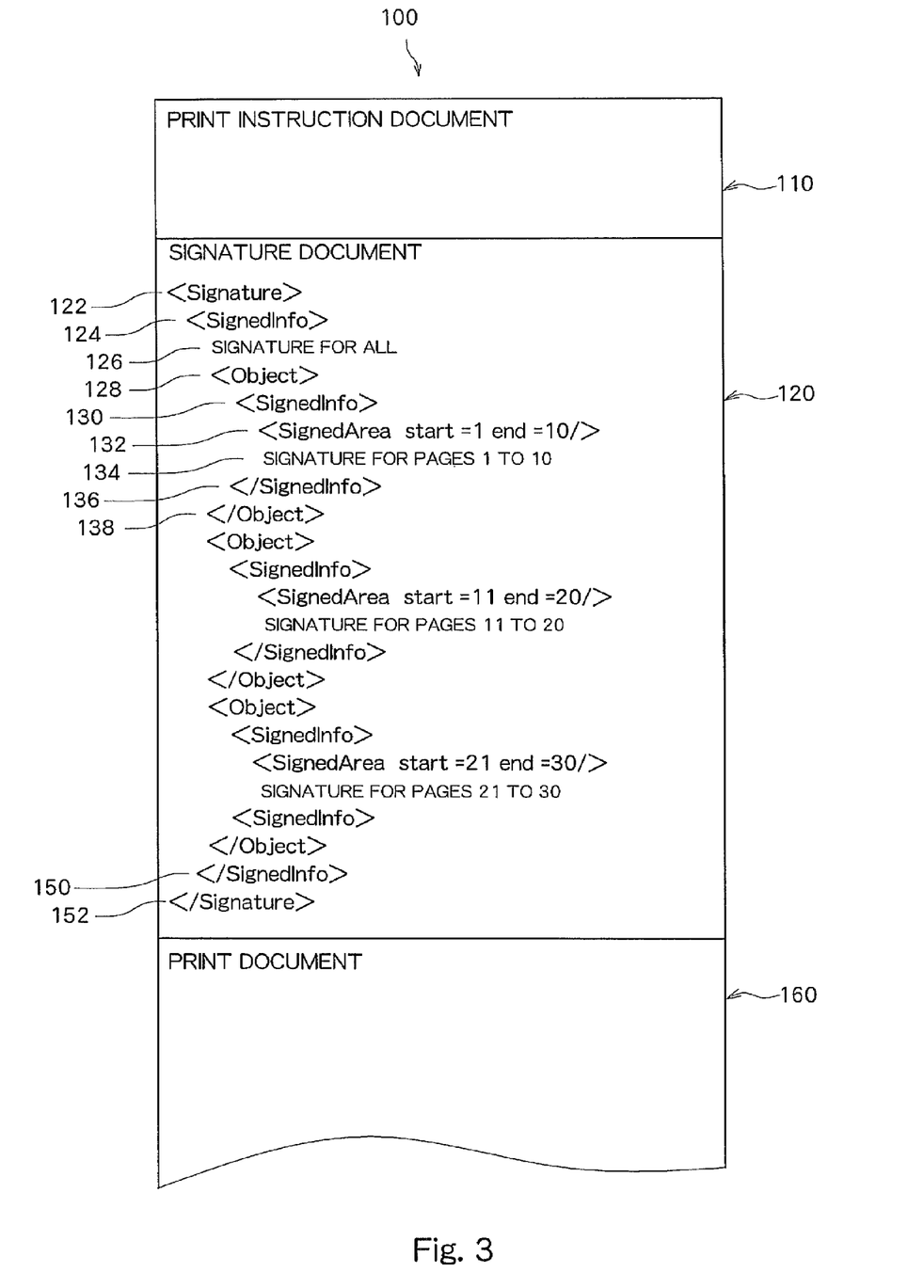
FIG. 3 is a diagram explaining example input data according to this exemplary embodiment.

FIG. 3 is a diagram schematically showing input data 100 to be input to the image-processing device 10 in response to a print request. The input data 100 include a print instruction document 110, a signature document 120, and a print document 160, all arranged and integrated with one another in this order. The print instruction document 110 is an electronic document where there is described a print instruction, including designation of a page of the print document 160 to be printed. The signature document 120 is an electronic document where there are specified an area with respect to which an electronic signature is attached and the value thereof (electronic signature data) in the print document 160. The print document 160 is an electronic document which is print data.

As shown in the drawing, the signature document 120 is described using a mark-up language, such as XML (Extensible Markup Language), or the like (a descriptive language in which a sentence structure, such as a caption, a hyperlink, and so forth, and modification information, such as a letter size, composition, and so forth, are described in the sentence by quoting a portion of the sentence by a special character string referred to as a "tag") In the signature document 120, the sentence is enclosed outermost by a <Signature>tag 122 and a </Signature>tag 152, whereby it is indicated that the quoted sentence concerns a signature. Further, the sentence is further enclosed, immediately inside these tags 122 and 152, by a <SignedInfo>tag 124 and a </SingedInfo>tag 150, whereby it is indicated that electronic signature data are written therein. Specifically, a "signature for all" of the print document 160 is written in the portion enclosed by the <SignedInfo>tag 124 and the </SingedInfo>tag 150. In the example shown, electronic signature data 126 in relation to the entire print document 160 are described immediately following the <SignedInfo>tag 124.

In the portion enclosed by the <SignedInfo>tag 124 and the </SingedInfo>tag 150 is defined an area enclosed by an <Object>tag 128 and a </Object>tag 138, where another area enclosed by a <SingedInfo>tag 130 and a </SignedInfo>tag 136 is defined. In the area enclosed by the <SingedInfo>tag 130 and the </SignedInfo>tag 136, <SignedAreastart=1end=10/>132 is described, whereby it is indicated that a "signature for one to ten pages" is attached, followed by corresponding electronic signature data 134. Similarly, a "signature for 11 to 20 pages" and a "signature for 21 to 30 pages" are also included in the signature document 120.

Figure 4:
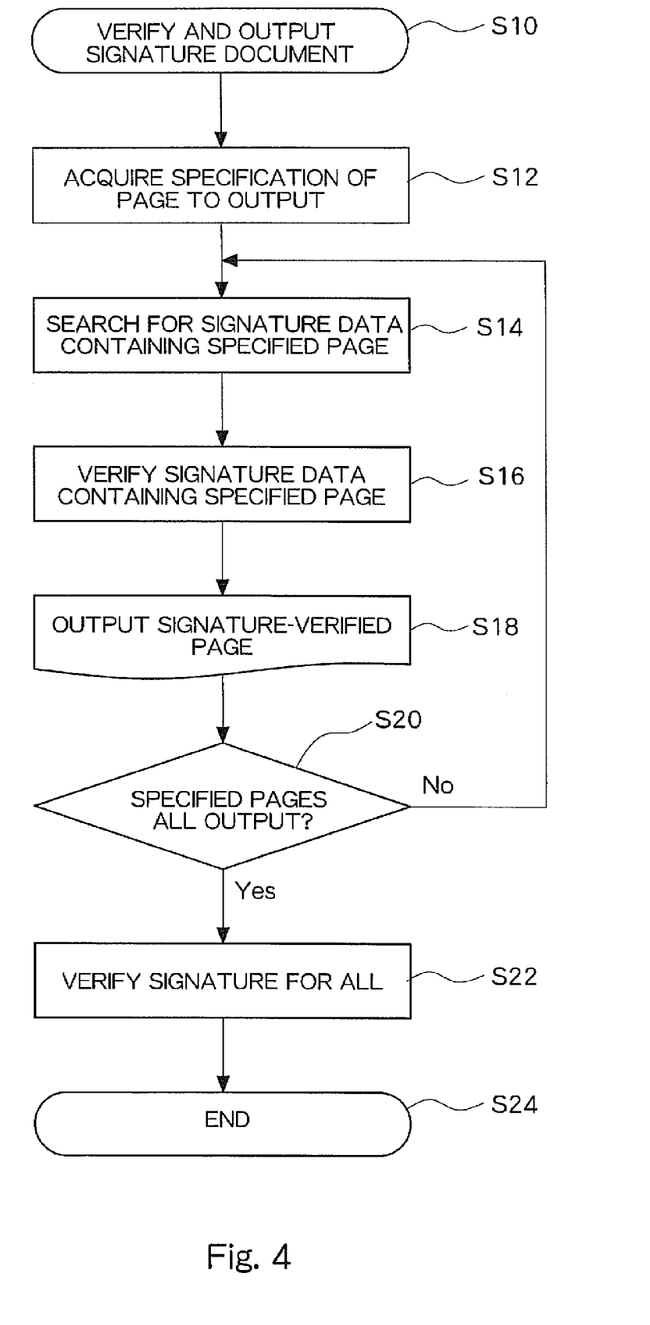
FIG. 4 is a flowchart showing a flow of a signature verification process according to the exemplary embodiment.

FIG. 4 is a flowchart showing a signature verification process carried out by the image-processing device (a print device) Specifically, in response to a print instruction by the input data 100, or the like, the image-processing device initiates signature document verification and a process for relevant output (S10). Initially, the print instruction document is analyzed to obtain information specifying a page to be printed (S12). Subsequently, while referring to the signature document, signature data relevant to the pages including the specified page are searched for (S14), and verified (S16). With successful completion of the verification, a page with the signature successfully verified among those to be printed is printed (S18). With the print output completed, a determination is made as to whether or not the print target pages have been all printed out (S20). With the output yet to be completed, the processes in steps S12 to S18 are repeated. Meanwhile, with the print output completed, the signature for all is verified (S22), and the process is completed (S24). It should be noted that, as described above, a notice informing of the ongoing verification, verification failure, and so forth, can be made during the series of above-described processes.

Figure 5:
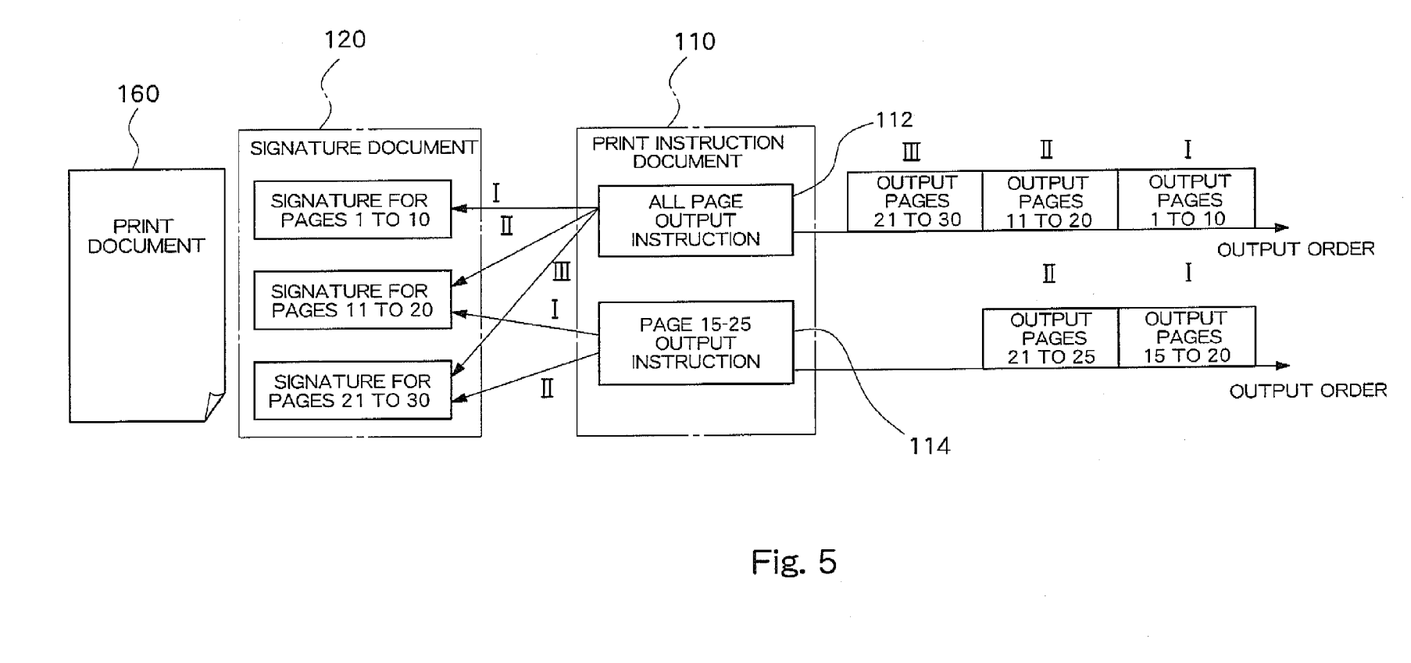
FIG. 5 is a schematic diagram showing the flow of a signature verification process according to the exemplary embodiment.

FIG. 5 is a diagram schematically showing a print process carried out on the basis of the input data 100 shown in FIG. 3. Here, it is assumed that the image-processing device obtains the print instruction document 110, the signature document 120, and the print document 160, and carries out printing in accordance with the print instruction document 110. With the print instruction document 110 instructing to print all pages, as indicated by reference numeral 112, the image-processing device verifies the signature attached to pages one to ten of the print document 160 being input with reference to the "signature for pages one to ten," as shown by the numeral I, in the signature document 120. With the signature successfully verified, "output of pages one to ten" begins without waiting for the completion of inputting of the entire print document 160. Subsequently, the image-processing device verifies the signature attached to pages 11 to 20 with reference to the "signature for pages 11 to 20," as shown by the numeral II, and "output of pages 11 to 20" begins. Similarly, the image-processing device verifies the signature attached to pages 21 to 30 with reference to the "signature for pages 21 to 30," as shown by the numeral III, and "output of pages 21 to 30" begins.

Meanwhile, with the print instruction document 110 instructing to print pages 15 to 25, as indicated by reference numeral 114, the image-processing device verifies the signature attached to pages 11 to 20 of the print document 160 being input with reference to the "signature for pages 11 to 20," as shown by the numeral I. With the signature successfully verified, "output of pages 15 to 20" begins while the print document 160 is being input. Subsequently, the image-processing device verifies the signature attached to pages 21 to 30, with reference to the "signature for pages 21 to 30," as indicated by numeral II, and outputs "pages 21 to 25."

Figure 6:
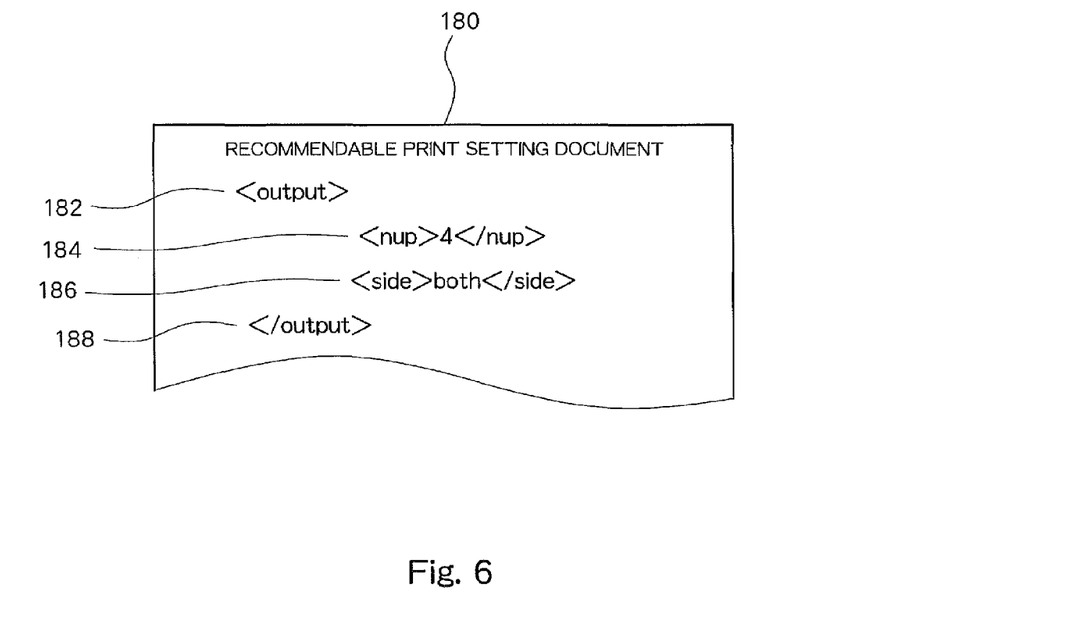
FIG. 6 is a diagram showing an example recommendable print setting document according to this exemplary embodiment.

Finally, with reference to FIG. 6, a case where recommendable print setting is made will be described. FIG. 6 shows a recommendable print setting document 180. The recommendable print setting document 180 is a document where a print manner (neat, easy to look at, economical, and so forth) appropriate for printing of the corresponding print data is set. The recommendable print setting document 180 is generally embedded as metadata in the head of the print data or embedded in a produced signature document.

In the recommendable print setting document 180, an output instruction is described in the area between an <output>tag 182 and a </output>tag 188. Specifically, <nup>4</nup> 184 specifies printing of four pages on one side of a sheet, and <side>both</side> 186 specifies double-sided printing. That is, the recommendable print setting document 180 specifies printing of four pages on each side of one sheet.

Here, a signature attachment area may be determined in units of four pages, which are likely to be printed on one side of a sheet, or eight pages, which are likely to be printed on one sheet, and an electronic signature is attached to the area in the determined unit. In particular, it is practical to attach an electronic signature to each of the page groups respectively including pages 1 to 4, pages 5 to 8, pages 9 to 12, and so forth (alternatively, page groups of pages 1 to 8, pages 9 to 16, pages 17 to 24, and so forth), as printing generally begins with the first page.

In the above, the multiple signature attachment areas are defined without overlapping with each other, with the area for the signature to all excluded. Alternatively, the multiple signature attachment areas can be defined overlapping each other. For example, after temporarily dividing the entire area into sections, signature attachment areas can be defined such that the adjacent sections overlap each other at the marginal portions thereof by some amount (the amount relatively small in view of the entire area, but large enough to identify the order of the adjacent sections, with an example being a few characters to a few rows in document data). In this case, verification relative to the modified signature attachment area can prove absence of falsification throughout the document data. That is, absence of data exchange between adjacent signature attachment areas is additionally proved, besides the absence of falsification in each signature attachment area.

Alternatively, a signature attachment area in units of a larger area, such as four or eight pages, and a signature attachment area in units of a smaller area, such as one page or the like, may be both defined, as shown in FIG. 6, so that a signature is attached to each of the areas. In this case, at the beginning of the inputting of the print data, when print data of the amount for one to four or eight pages are yet to be input, signatures attached to smaller areas, such as, one, two, three, and four pages, are sequentially verified. Then, if the print data of the amount for five to eight pages has been input by the time to begin verification of the signature attached to the fifth page, the range of signature verification is changed so as to verify a signature attached to a larger range, such as an area of five to eight pages. That is, according to one aspect of the present invention, in order to cope with a case where signatures are attached to signature attachment areas varying in size in a hierarchical manner, the image-processing device may have a process means for selecting a signature attachment area which enables efficient signature verification.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A print device, comprising:
   a determination unit that determines whether or not attachment of a partial signature to print data of a document to be printed is permitted, the determination is made on the basis of attribute information of the print data using a character recognition process,
   a print data acquisition unit that acquires, when the determination unit determines that attachment of the partial signature to the print data of the document to be printed is permitted, the print data having a plurality of signature attachment areas defined thereon, each signature attachment area covering a different set of pages of the document to be printed each signature attachment area having electronic signature data produced therefore and attached thereto, the electronic signature data being produced by calculating a hash value of a part of the print data corresponding to a set of pages covered by the signature attachment area and encrypting the obtained hash value by means of a private key;
   a range data acquisition unit that acquires data indicative of a range of a print target area defined on the print data, the print target area being defined as one or more pages of the document to be printed; and
   a verification unit that verifies, before completion of acquisition of the print data by the print data acquisition unit, the electronic signature data attached to the signature attachment area containing at least a part of the print target area;
   wherein the print data includes page-unit electronic signature data assigned to a unit of one page, and sheet-unit electronic signature data assigned to a unit of one side of a sheet including a predetermined number of pages, the predetermined number being two or more; and
   wherein, at an initial stage of sequential acquisition of the print data by the print data acquisition unit beginning from a first page, the verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

2. The print device according to claim 1, further comprising
   a print unit that prints, before completion of verification of the electronic signature data by the verification unit, the print data relevant to the print target area contained in the signature attachment area verified by the verification unit.

3. The print device according to claim 1, further comprising
   a print unit that prints, before completion of acquisition of the print data by the print data acquisition unit, the print data relevant to the print target area contained in the signature attachment area verified by the verification unit.

4. The print device according to claim 2, further comprising
   a failure notification unit that notifies of verification failure when verification of electronic signature data attached to another signature attachment area fails after printing by the print unit has already begun.

5. The print device according to claim 4, wherein the failure notification unit notifies of the verification failure by outputting a sheet where a denotation indicative of the verification failure is shown after a printed sheet relevant to the print target area is output.

6. The print device according to claim 2, further comprising
   a stop unit that stops printing by the print unit when verification of the electronic signature data attached to another signature attachment area fails after printing by the print unit has already begun.

7. The print device according to claim 2, further comprising
   an uncompleted notification unit that notifies of uncompleted verification as to the print data being printed, before completion of verification of the electronic signature data by the verification unit.

8. The print device according to claim 1, wherein one or more signature attachment areas partially overlap one or more other signature attachment areas, and the verification unit verifies the electronic signature data attached to a signature attachment area selected from the overlapping signature attachment areas.

9. The print device according to claim 1, wherein the plurality of signature attachment areas are defined such that at least parts thereof overlap with each other, and the verification unit verifies the electronic signature data attached to a plurality of signature attachment areas located adjacent to each other while covering the print target area.

10. The print device according to claim 1, wherein the print data acquisition unit receives the print data to thereby acquire the print data.

11. The print device according to claim 1, further comprising
    a memory that stores the print data,
    wherein
    the print data acquisition unit reads the print data stored in the memory to thereby acquire the print data.

12. A print method, comprising:
    determining whether or not attachment of a partial signature to print data of a document to be printed is permitted, the determination is made on the basis of attribute information of the print data using a character recognition process;

acquiring, when it is determined that attachment of the partial signature to the print data of the document to be printed is permitted, the print data having a plurality of signature attachment areas defined thereon, each signature attachment area covering a different set of pages of the document to be printed, each signature attachment area having electronic signature data produced therefor and attached thereto, the electronic signature data is produced by calculating a hash value of a part of the print data corresponding to the set of pages covered by the signature attachment area and encrypting the obtained hash value by means of a private key;

acquiring data indicative of a range of a print target area defined on the print data; the print target area being defined as one or more pages of the document to be printed;

verifying, before completion of acquisition of the print data by the print data acquisition unit, the electronic signature data attached to the signature attachment area containing at least a part of the print target area the verification unit verifies a partial signature even before completion of the print data;

providing the print data having page-unit electronic signature data assigned to a unit of one page, and sheet-unit electronic signature data assigned to a unit of one side of a sheet including a predetermined number of pages, the predetermined number being two or more; and performing verification concerning each acquired page by verifying corresponding page-unit electronic signature data at an initial stage of sequential acquisition of the print data beginning from a first page, and, while performing the verification of page-unit electronic signature data, when acquisition of data is completed for all pages included in one side of a sheet to be printed subsequent to a part of the print data concerning which verification of electronic signature data is already performed, verification is performed concerning the one side of a sheet by verifying corresponding sheet-unit electronic signature data.

13. A non-transitory computer-readable medium storing a program causing a computer to execute a process for printing, the process comprising:

determining whether or not attachment of a partial signature to print data of a document to be printed is permitted, the determination is made on the basis of attribute information of the print data using a character recognition process, acquiring, when it is determined that attachment of the partial signature to the print data of the document to be printed is permitted print data having a plurality of signature attachment areas defined thereon, each signature attachment area covering a different set of pages of the document to be printed, each signature attachment area having electronic signature data produced therefor and attached thereto, the electronic signature data is produced by calculating a hash value of a part of the print data corresponding to the set of pages by the signature attachment area and encrypting the obtained hash value by means of a private key;

acquiring data indicative of a range of a print target area defined on the print data; the print target area being defined as one or more pages of the document to be printed; and verifying, before completion of acquisition of the print data by the print data acquisition unit, the electronic signature data attached to the signature attachment area containing at least a part of the print target area providing the print data having electronic signature data assigned to a unit of one page, and sheet-unit electronic signature data assigned to a unit of one side of a sheet including a predetermined number of pages, the predetermined number being two or more; and performing verification concerning each acquired page by verifying corresponding page-unit electronic signature data at an initial stage of sequential acquisition of the print data beginning from a first page, and, while performing the verification of page-unit electronic signature data, when acquisition of data is completed for all pages included in one side of a sheet to be printed subsequent to a part of the print data concerning which verification of electronic signature data is already performed, verification is performed concerning the one side of a sheet by verifying corresponding sheet-unit electronic signature data.

14. A print data production device, comprising:

a determination unit that determines whether or not attachment of a partial signature to print data of a document to be printed is permitted, the determination is made on the basis of attribute information of the print data using a character recognition process;

an area setting unit that sets, when the determination unit determines that attachment of the partial signature to the print data of the document to be printed is permitted, a plurality of signature attachment areas in relation to print data, each signature attachment area covering a different set of pages of the document to be printed;

a production unit that produces electronic signature data in relation to each of the signature attachment areas, the electronic signature data is produced by calculating a hash value of a part of the print data corresponding to the set of pages covered by the signature attachment area and encrypting the obtained hash value by means of a private key;

a setting unit that sets, in relation to the print data, a number of pages to be printed on one or both sides of a single sheet, wherein the area setting unit sets a page to be printed on one or both sides of the single sheet, as the signature attachment area, the print data having page-unit electronic signature data assigned to a unit of one page, and sheet-unit electronic signature data assigned to a unit of one side of a sheet including a predetermined number of pages, the predetermined number being two or more, at an initial stage of sequential acquisition of the print data by the print data acquisition unit beginning from a first page, a verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

15. A print data generation method, comprising determining whether or not attachment of a partial signature to print data of a document to be printed is permitted, the determination is made on the basis of attribute information of the print data using a character recognition process, the determination is made on the basis of attribute information of the print data using a character recognition process;

setting, when it is determined that attachment of the partial signature to the print data of the document to be printed is permitted, a plurality of signature attachment areas in relation to the print data, each signature attachment area covering a different set of pages of the document to be printed;

producing electronic signature data in relation to each of the signature attachment areas, the electronic signature data is produced by calculating a hash value of a part of the print data corresponding to the set of pages covered by the signature attachment area and encrypting the obtained hash value by means of a private key; and setting, in relation to the print data, a number of pages to be printed on one or both sides of a single sheet, wherein in setting the area, a page to be printed on one or both sides of the single sheet is set as the signature attachment area, the print data having page-unit electronic signature data assigned to a unit of one page, and sheet-unit electronic signature data assigned to a unit of one side of a sheet including a predetermined number of pages, the predetermined number being two or more, at an initial stage of sequential acquisition of the print data by the print data acquisition unit beginning from a first page, a verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

16. A non-transitory computer-readable medium storing a program causing a computer to execute a process for printing, the process comprising:

determining whether or not attachment of a partial signature to print data of a document to be printed is permitted, the determination is made on the basis of attribute information of the print data using a character recognition process;

setting, when it is determined that attachment of the partial signature to the print data of the document to be printed is permitted, a plurality of signature attachment areas in relation to the print data, each signature attachment area covering a different set of pages of the document to be printed;

producing electronic signature data in relation to each of the signature attachment areas, the electronic signature data is produced by calculating a hash value of a part of the print data corresponding to the set of pages covered by the signature attachment area and encrypting the obtained hash value by means of a private key; and setting, in relation to the print data, a number of pages to be printed on one or both sides of a single sheet, wherein in setting the area, a page to be printed on one or both sides of the single sheet is set as the signature attachment area, the print data having page-unit electronic signature data assigned to a unit of one page, and sheet-unit electronic signature data assigned to a unit of one side of a sheet including a predetermined number of pages, the predetermined number being two or more, at an initial stage of sequential acquisition of the print data by the print data acquisition unit beginning from a first page, a verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

17. A print data production device, comprising:

a determination unit that determines whether or not to permit setting of a plurality of signature attachment areas in relation to the print data of a document to be printed, on the basis of attribute information of the print data, the determination is made on the basis of attribute information of the print data using a character recognition process;

an area-setting unit that sets the plurality of signature attachment areas in relation to the print data when the determination unit determines to permit the setting, each signature attachment area covering a different set of pages of the document to be printed; and a production unit that produces electronic signature data in relation to the print data in each of the signature attachment areas, the electronic signature data is produced by calculating a hash value of a part of the print data corresponding to the set of pages covered by the signature attachment area and encrypting the obtained hash value by means of a private key.

18. A print data production method, comprising:

determining whether or not to permit setting of a plurality of signature attachment areas in relation to the print data of a document to be printed, on the basis of attribute information of the print data, the determination is made on the basis of attribute information of the print data using a character recognition process;

setting the plurality of signature attachment areas in relation to the print data when the determination unit determines to permit the setting, each signature attachment area covering a different set of pages of the document to be printed; and producing electronic signature data in relation to the print data in each of the signature attachment areas, the electronic signature date is produced by calculating a hash value of a part of the print data corresponding to the set of pages covered by the signature attachment area and encrypting the obtained hash value by means of a private key;

wherein the print data includes page-unit electronic signature data assigned to a unit of one page, and sheet-unit electronic signature data assigned to a unit of one side of a sheet including a predetermined number of pages, the predetermined number being two or more;

wherein, at an initial stage of sequential acquisition of the print data by the print data acquisition unit beginning from a first page, a verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

19. A non-transitory computer-readable medium storing a program causing a computer to execute a process for printing, the process comprising:
  determining whether or not to permit setting of a plurality of signature attachment areas in relation to the print data of a document to be printed, on the basis of attribute information of the print data, the determination is made on the basis of attribute information of the print data using a character recognition process;
  setting the plurality of signature attachment areas in relation to the print data when the determination unit determines to permit the setting, each signature attachment area covering a different set of pages of the document to be printed; and
  producing electronic signature data in relation to the print data in each of the signature attachment areas, the electronic signature date is produced by calculating a hash value of a part of the print data corresponding to the set of pages covered by the signature attachment area and encrypting the obtained hash value by means of a private key
  wherein the print data includes page-unit electronic signature data assigned to a unit of one page, and sheet-unit electronic signature data assigned to a unit of one side of a sheet including a predetermined number of pages, the predetermined number being two or more;
  wherein at an initial state of sequential acquisition of the print data by the print data acquisition unit beginning from a first page, a verification unit performs verification concerning each acquired page by verifying corresponding page-unit electronic signature data, and, while performing the verification of page-unit electronic signature data, when acquisition of data is completed for all pages included in one side of a sheet to be printed subsequent to a part of the print data concerning which verification of electronic signature data by the verifying unit is already performed, the verification unit performs verification concerning the one side of a sheet by verifying corresponding sheet-unit electronic signature data.

* * * * *